United States Patent Office 3,508,532
Patented Apr. 28, 1970

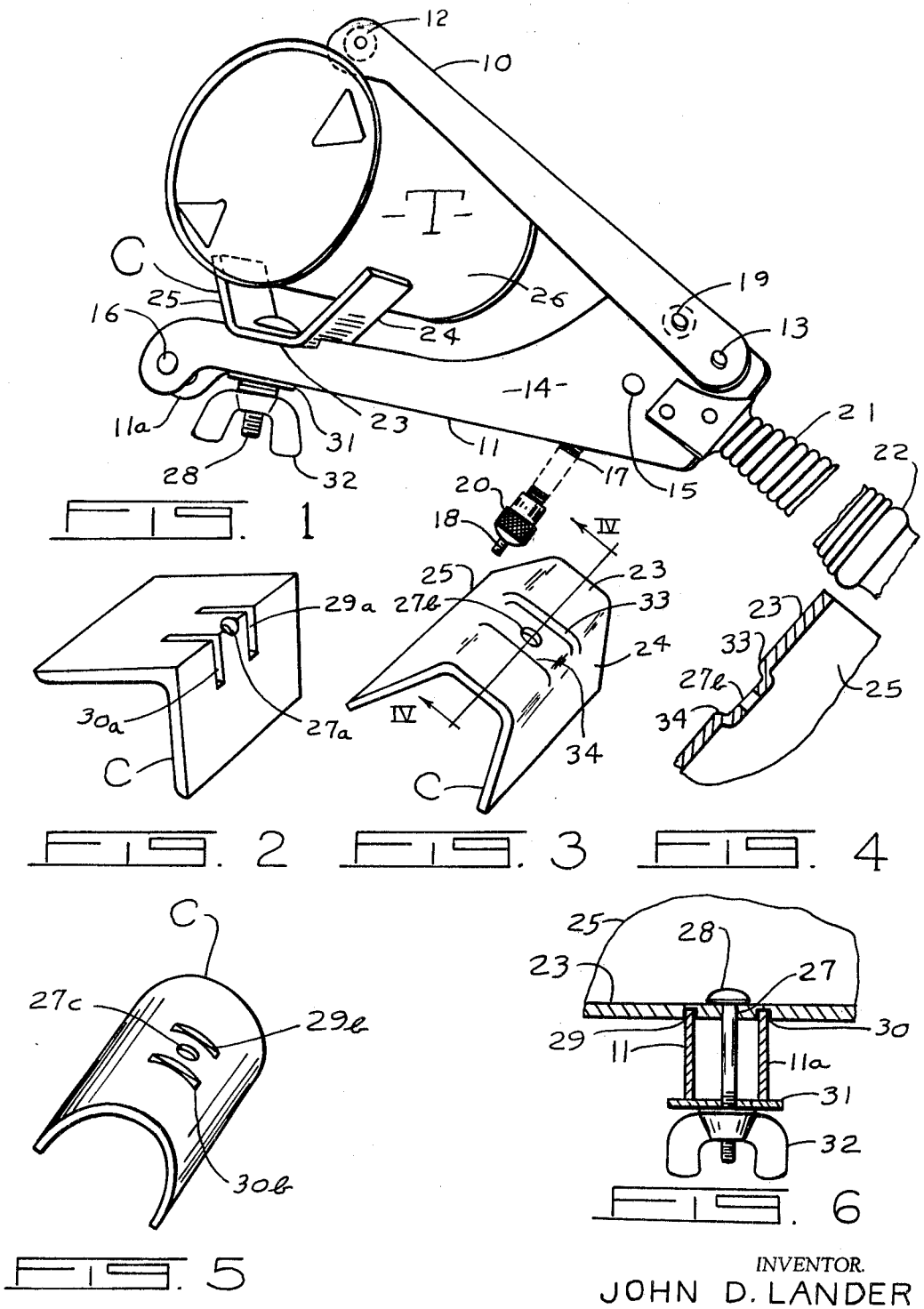

3,508,532
ATTACHMENT CONVERSION DEVICE FOR A PIGEON TRAP
John D. Lander, 7408 Rockwood Road, Wichita, Kans. 67208
Filed Aug. 2, 1965, Ser. No. 476,757
Int. Cl. F41b 3/04
U.S. Cl. 124—41          2 Claims

ABSTRACT OF THE DISCLOSURE

A hollow or channel like piece of material having attachment portions that are fittably receivable on a pigeon trap jaw and having means for rigidly attaching the channel to the jaw and the hollow piece is so shaped that it will receive and hold a multiplicity of various shaped and sized objects for throwing purposes.

---

My invention relates to a device for converting a pigeon trap throwing device to a device that will hold and throw objects, other than a clay pigeon, for which the trap was originally intended to throw. The invention consists of an attachment that can be attached to one of the jaws of the pigeon trap throwing device that will fit and hold objects other than the clay pigeon even though they may be of a different size and shape than the clay pigeon.

Now referring to the accompanying drawings to which similar numerals of reference designate the same parts throughout the several figures of the drawings.

FIG. 1 is a side view of the pigeon trap jaws and to one of which the conversion device has been applied.

FIG. 2 is a perspective view of a modified form of the conversion device.

FIG. 3 is a perspective view of another modified form of the conversion device.

FIG. 4 is a detail sectional view through the conversion device, the view being as seen from the lines IV—IV in FIG. 3 and looking in the direction of the arrows.

FIG. 5 is a perspective view of still another modification or design of the conversion device.

FIG. 6 is an enlarged detail sectional view illustrating how the conversion device is attached to one of the jaws of the pigeon trap.

In the drawings is shown the working parts of a conventional pigeon throwing trap, which consists of a pair of jaws 10 and 11, the jaw 10 being merely a flat strip of material on the outer end of which is revolvably mounted a roller 12, the inner end of the jaw 10 is pivotally mounted at 13 on a base plate 14 which is an integral part of the inner end portion of a second jaw 11. The jaw 11 is provided with a second jaw member 11a that is spaced away from the jaw 11 and is so shaped to lie in registry with the jaw 11 therebehind. The jaw members 11 and 11a are held in their spaced apart position by spacer elements 15 and 16 in such a manner that the edge of a clay pigeon would fit between the jaw parts 11 and 11a and the other side of the pigeon would rest against the roller 12.

The two jaws 10, 11–11a are springably tensioned toward each other by means of a spring 17 that surrounds a long pin 18 which slidably passes through the spacer element 15 and pivotally attaches to the jaw 10 at the point 19 and a thumb nut 20 is threaded on the outer end of the pin 18 and bears against the outer end of the spring 17 whereby the pressure of the spring 17 may be increased or decreased to suit the pleasure of the person using the trap.

The lower edge of the base plate 14 is rigidly attached to one end of a rather stiff helical spring 21, the other end of the spring 21 is rigidly fixed on the outer end of a handle 22 by which the device may be handled in the operation of throwing a clay pigeon as is well understood by those familiar with a trap of this kind. All of this is just a conventional pigeon trap designed for throwing clay pigeons and nothing else.

Now comes the proposition by the use of my conversion device, the trap will hold other objects such as tin cans, bottles and the like, can be held in the trap and thrown therefrom in the same manner as clay pigeons as a moving target for those practicing shooting the same as clay pigeons.

Now my conversion device comprises a comparatively short channel like element which will fit against the sides of a can or bottle, or the like and presses against the outer end of the jaw 10.

As shown in FIG. 1 the conversion member C consists of a channel like member having a flat base portion 23 from which extends leg elements 24 and 25 that are an integral part of the base member 23, and the leg elements 24 and 25 slope outwardly from the base member 23 so that the curved wall 26 or a can or bottle T will fit solidly against the outer edges of the leg elements 24 and 25 so as to hold the can T in a position transverse to the trap legs 10, 11 and 11a.

In the center of the base element 23 is a hole 27, either square or round, through which a bolt 28 may be passed for purposes of attaching a device to the jaw parts 11 and 11a as will later be described.

The back side of the base plate 23 is provided with a pair of grooves 29 and 30 that extend transversely across the base plate 23 and are positioned, one on either side of the hole 27. These grooves 29 and 30 are so spaced apart that when the channel element C is placed against the leg elements 11 and 11a that the edges of the jaw 11–11a will fit into the grooves 29 and 30, whereupon the bolt 28 may be passed through a hole 27 and between the jaw parts 11 and 11a and project therebeyond, whereupon a washer 31 may be slipped over a bolt 28 and a wing nut 32, may be threaded on the bolt 38 to solidly bear against the washer 31 to rigidly seat the channel element C against the edges of the jaw parts 11 and 11a and in their respective grooves 29 and 30 so as to make the device rigid on the jaw 11–11a in a fixed transverse position as shown in FIG. 6.

In FIG. 2 is shown a modified form of the device, in which the channel element C is now V-shaped instead of a channel as above described and in the angle of the V is the bolt hole 27a and on either side of which are the two grooves 29a and 30a all of which function the same as described in the device shown in FIGS. 1 and 6, and in assembling this device on the jaw 11–11a the same bolt 28, washer 31, and wing nut 32 is employed the same as before, and the edges of the jaw parts 11 and 11a rest in the grooves 29 and 30a the same as described before.

In FIG. 3 is shown a modified form of the conversion channel C, wherein the central portion of the base plate 23 is depressed inwardly to leave shoulders 33 and 34 such as when the channel is assembled on the jaw 11–11a the shoulders 33 and 34 will bear against the outside edge portions of the jaw parts 11 and 11a and the hole 27b is positioned between the shoulders 33 and 34 whereby the same bolt 28 and washer 31 and wing nut 32 may be used to assemble the device the same as above described.

In FIG. 5 is shown still another modification of the device in which the channel element C now becomes a hollow half round having the hole 27c and slots 29b and 30b as shown in FIG. 5 and for the same purpose.

The device as shown and above described having been placed on the jaw 11–11a is now ready to receive and hold a bottle or can T preparatory to be thrown from the trap in the same manner as clay pigeons are usually thrown.

Now while the device as shown and described is probably the preferred form of the device, it is to be understood that such other modifications as lie within the scope of the appended claims may be employed without departing from the spirit and intention of the invention.

Now having fully shown and described my invention, what I claim is:

1. A conversion device for attachment to a device having jaws for holding and throwing clay discs into the air as a shooting target; said conversion device being an elongated hollow faced element for receiving an object therein that is to be thrown as the target, said hollow faced element having spaced apart grooves, said spaced apart grooves being for receiving a portion of said jaw; an opening through said element intermediate said grooves, means receivable in said opening for rigidly holding the hollow faced element on said jaw, said means comprising a bolt, washer and wing nut, said bolt adapted to pass through said opening in the conversion element at a point intermediate said grooves and also to extend through said washer, said wing nut adapted to be threaded on the said bolt to engage said washer to rigidly bind and hold the said hollow faced element on said jaw in a predetermined position thereon.

2. A conversion device for attachment to a device having jaws for holding and throwing clay discs in the air as a shooting target; said conversion device being an elongated hollow faced element for receiving and holding a portion of an object therein that is to be projected therefrom as a shooting target, said hollow faced element having a depressed portion in the rear wall thereof to provide shoulders that are fittable against the sides of the jaw portion with which the device is to be associated with and assembled on, said depressed portion having an opening therethrough and positioned intermediate the said shoulders, said means for holding the said hollow faced conversion element on the said jaw being a bolt and nut, said bolt being passed through the said opening and jaw to position the said shoulders against the sides of the jaw structure, said nut being threaded on the bolt to exert its pressure against the said jaw to rigidly bind and hold the said hollow faced element on the said jaw.

References Cited

UNITED STATES PATENTS

| | | | |
|---|---|---|---|
| 387,268 | 8/1888 | Teipel | 124—43 |
| 2,122,984 | 7/1938 | Loomis | 124—43 XR |
| 3,221,726 | 12/1965 | Walker | 124—7 |

ANTON O. OECHSLE, Primary Examiner

W. R. BROWNE, Assistant Examiner

U.S. Cl. X.R.

124—4